US005508978A

United States Patent [19]

Kalbermatter et al.

[11] Patent Number: 5,508,978
[45] Date of Patent: Apr. 16, 1996

[54] TELEPHONE ON WHICH THE NUMBER CALLED IS COMPOSED BY A CROWN OF THE HOROLOGICAL TYPE

[75] Inventors: Stefan Kalbermatter, Grenchen; Pierre-André Meister, Bienne, both of Switzerland

[73] Assignee: Eta SA Fabriques d'Ebauches, Grenchen, Switzerland

[21] Appl. No.: 511,868

[22] Filed: Aug. 7, 1995

[30] Foreign Application Priority Data

Aug. 23, 1994 [FR] France ................... 94 10205

[51] Int. Cl.⁶ ................... G04B 47/00; H04M 1/03
[52] U.S. Cl. ................... 368/13; 379/90; 379/428
[58] Field of Search ................... 368/4, 10, 13, 368/276; 379/90, 428, 430, 433

[56] References Cited

U.S. PATENT DOCUMENTS

| | | | |
|---|---|---|---|
| 4,398,831 | 8/1983 | Fatton et al. | 368/76 |
| 4,726,687 | 2/1988 | Gander | 368/10 |
| 4,847,818 | 7/1989 | Olsen | 368/10 |
| 5,008,864 | 4/1991 | Yoshitake | 368/10 |
| 5,224,076 | 6/1993 | Thorp | 368/10 |
| 5,239,521 | 8/1993 | Blonder | 368/10 |

FOREIGN PATENT DOCUMENTS

| | | |
|---|---|---|
| 589353 | 9/1993 | European Pat. Off. . |
| 569868 | 11/1993 | European Pat. Off. . |
| 2240071 | 7/1991 | United Kingdom . |

OTHER PUBLICATIONS

Patent Abstracts of Japan vol. 7 No. 6 (P–167), 11 Jan. 1983 & JP–A–57 163890 (Sharp K.K.).
Patent Abstracts of Japan vo. 11 No. 236 (P–601), 4 Aug. 1987 & JP–A–62 047572 (Casio Computer Co Ltd).

*Primary Examiner*—Vit W. Miska
*Attorney, Agent, or Firm*—Griffin, Butler, Whisenhunt & Kurtossy

[57] ABSTRACT

A portable wireless telephone including a main unit of small volume to which an antenna, an earpiece and a microphone are connected. The means for composing a number to be called include a display system (4, 5, 13) in which the digits making up the number to be called can be displayed, one after another, by the manipulation of a crown (10). Such crown can be rotated (60) then pressed (61) in order respectively to choose a digit then confirm it and continuing thus until said number is entirely composed. The telephone can be advantageously combined with a timepiece.

4 Claims, 6 Drawing Sheets

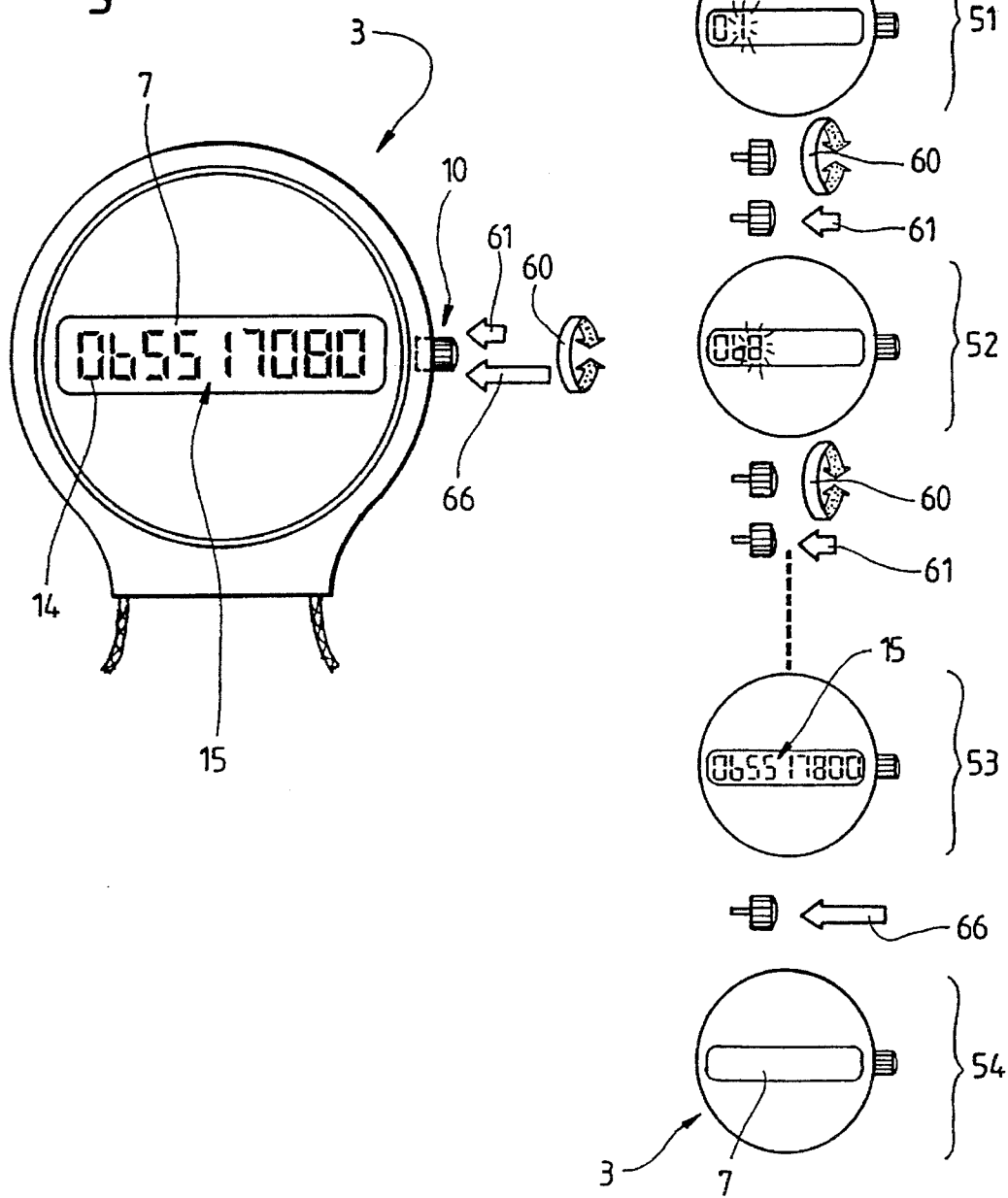

TELEPHONE ON WHICH THE NUMBER CALLED IS COMPOSED BY A CROWN OF THE HOROLOGICAL TYPE

The present invention relates to a portable wireless telephone including a principal unit of small volume, a microphone and an earpiece coupled to said principal unit, this latter comprising means for the composition of a number to be called.

A portable wireless telephone generally includes a handset held in the hand and placed against the ear. It comprises an earpiece and a microphone separated by a zone including the principal unit in which is found the means for composing a number to be called, generally a keyboard. Such handset is heavy and awkward, above all if it concerns a long distance telephone covering a region or an entire country. Should it be desired to reduce the dimensions of the telephone for example to the point where it can be carried almost permanently on the human body whilst leaving the hands free, as a corollary the principal unit and thus the field reserved to the keyboard will come to be reduced. The keys become minuscule as well as the digits and signs which are affixed thereto, to a degree such that the indications borne thereby are scarcely visible and the keys themselves are hardly ergonomic, the dimensions of the fingers which must actuate them being much greater than the dimensions of a key. Such a miniature keyboard ought thus to be manipulated by means of a tool resembling a rod of small diameter if it is desired to avoid actuating several keys at the same time, which would bring about errors in composing the number to be called. The use of such a tool is undesirable for evident reasons of immediate availability and of loss of time.

To overcome the drawbacks cited hereinabove, the telephone according to the invention is endowed with means for composing a number to be called including at least one display system in which at least the digits from 0 to 9 making up such number to be called can be displayed one after the other by the manipulation of a crown of the horological type, said crown being adapted to be rotated, then pressed in order respectively to choose a digit making up said number, and then confirm said digit, and continuing thus until said number is entirely composed.

The characteristics and advantages of the invention will appear upon reading the description of several specific embodiments thereof. The description which follows is made having reference to the annexed drawings which are given solely by way of example.

FIG. 8 is a plan view of the telephone according to the invention and according to a third embodiment, and FIG. 9 is a table or flow chart explaining the various manipulations to be applied to the crown in order to compose the telephone number on the apparatus shown in FIG. 8.

Figure 1:
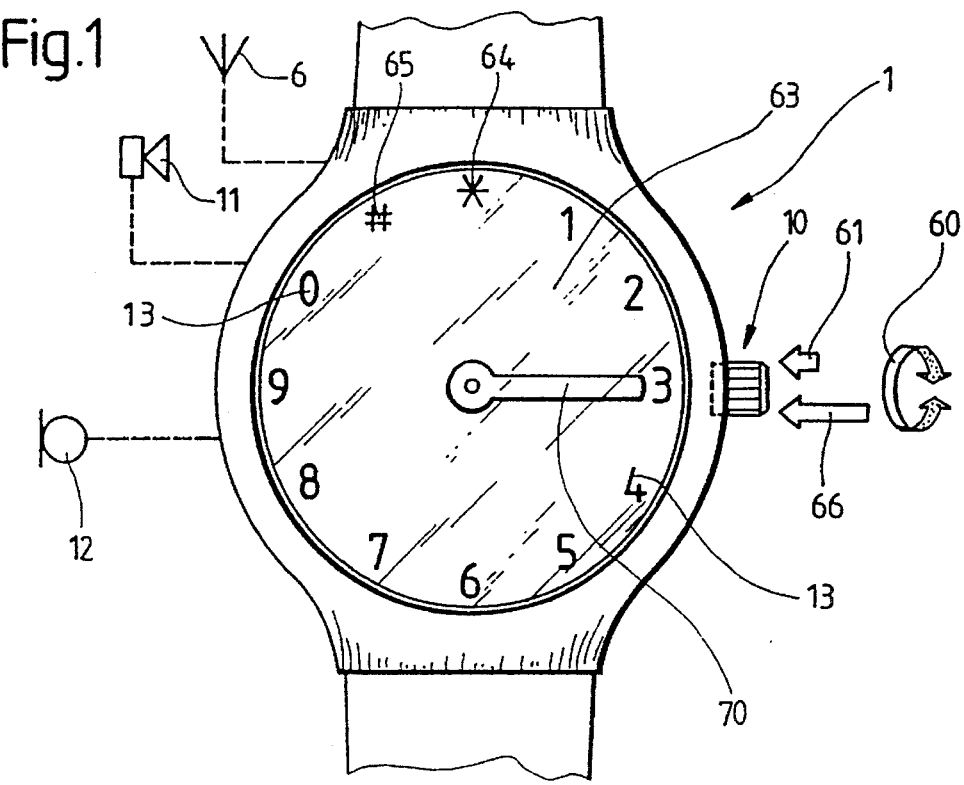
FIG. 1 is a plan view of the telephone according to the invention and according to a first embodiment implemented in the simplest sense thereof.

The portable wireless telephone of FIG. 1 includes a principal unit 1 of small volume. Thereby it is desired to express the fact that unit 1 is on the order of magnitude, for example, of a watch worn on the wrist and attached by means of a bracelet. To such unit 1 an antenna 6, an earpiece 11 and a microphone 12 are coupled. The antenna 6 can form an integral portion of the bracelet as can the microphone 12. The earpiece 11 can be incorporated into unit 1 and be, for example, of the piezoelectric type. Such unit 1 comprises means for composing a number to be called. In the first embodiment shown on FIG. 1, such composing means include at least one display system in which at least the digits 0 to 9, referenced 13, can be shown up one after another by the manipulation of a crown 10 of the horological type. When the crown 10 is driven in rotation (60), it is possible to choose one of the digits 13. When one of such digits is chosen, a pressure 61 is exerted on said crown in order to confirm the chosen digit. From there, a new rotation of crown 10 enables choosing a following digit which will again be confirmed by pressing on the crown 10. This exercise is repeated until the telephone number is entirely composed.

In the case of the first embodiment shown on figure 1, the display system includes a dial 63 on which appear at least digits 0 to 9 completed here for certain telephoning needs by the star sign * 64 and sharp sign #65. The dial 63 is surmounted by a single hand 70 which is actuated by a stepping motor internal to unit 1. Such motor is controlled by the rotation 60 of crown 10 in order to bring hand 70 onto the chosen digit (here digit 3). This being effected, a pressure 61 exerted on crown 10 enables confirmation of the chosen digit.

Figure 2:
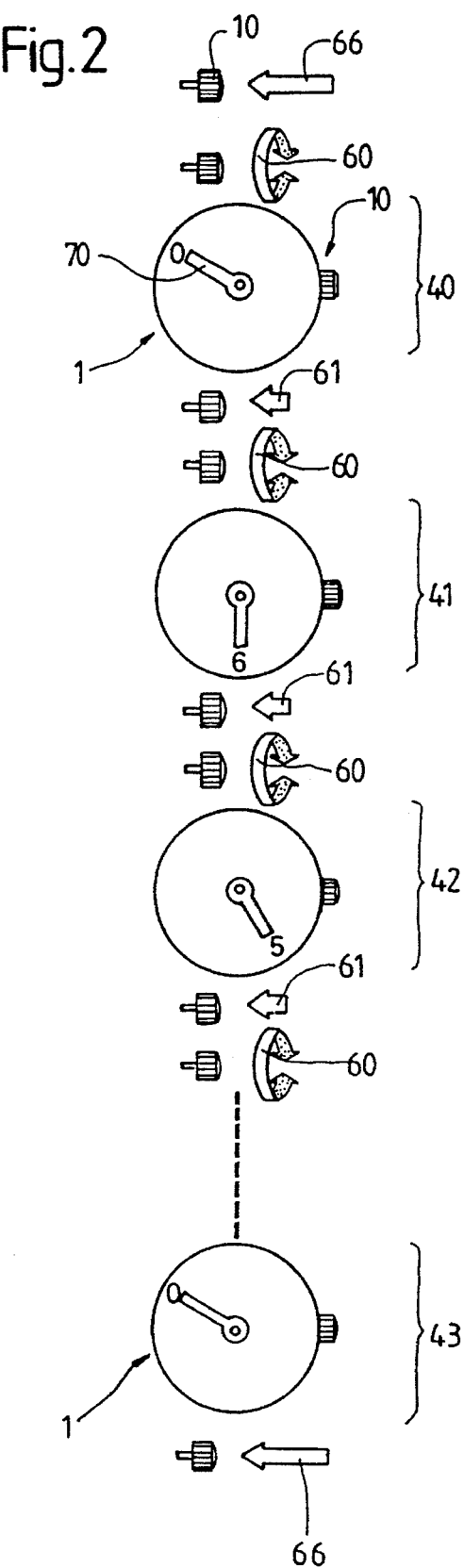
FIG. 2 is a table or flow chart explaining the various manipulations to be applied to the crown in order to compose the telephone number on the apparatus shown on FIG. 1.

The flow chart or table of FIG. 2 explains the various manipulations to be applied to crown 10 in order to compose the telephone number. At the beginning, a pressure of long duration 66 on crown 10 enables entering a line and obtaining the musical signal confirming such entry. In rotating crown 10, the hand 70 is positioned on the first digit 0 of the number to be composed, which digit 0 is confirmed by a pressure 61 of short duration exerted on crown 10. It concerns the step referenced 40 on FIG. 2. By exerting a new rotation 60 on crown 10, the digit 6 is chosen (step referenced 41) which again is confirmed by a pressure 61 on crown 10. In step 42 the digit 5 is chosen and confirmed. Such operations are repeated until the number called, for example 065 51 78 00, is entirely composed. When the last digit 0 (step 43) has been confirmed, the correspondent is called then the conversation can be established. At the end of the connection, the line is cut off by exerting a long duration pressure 66 on crown 10.

As a variant of what has been said hereinabove, the first long duration pressure 66 preceding step 40 can bring about the placing into memory of the entire telephone number, after which such number is sent onto the line during a second long duration pressure 66 following step 43. In such case, once the conversation has been terminated, a third long duration pressure is necessary in order to cut the line.

Figure 3:
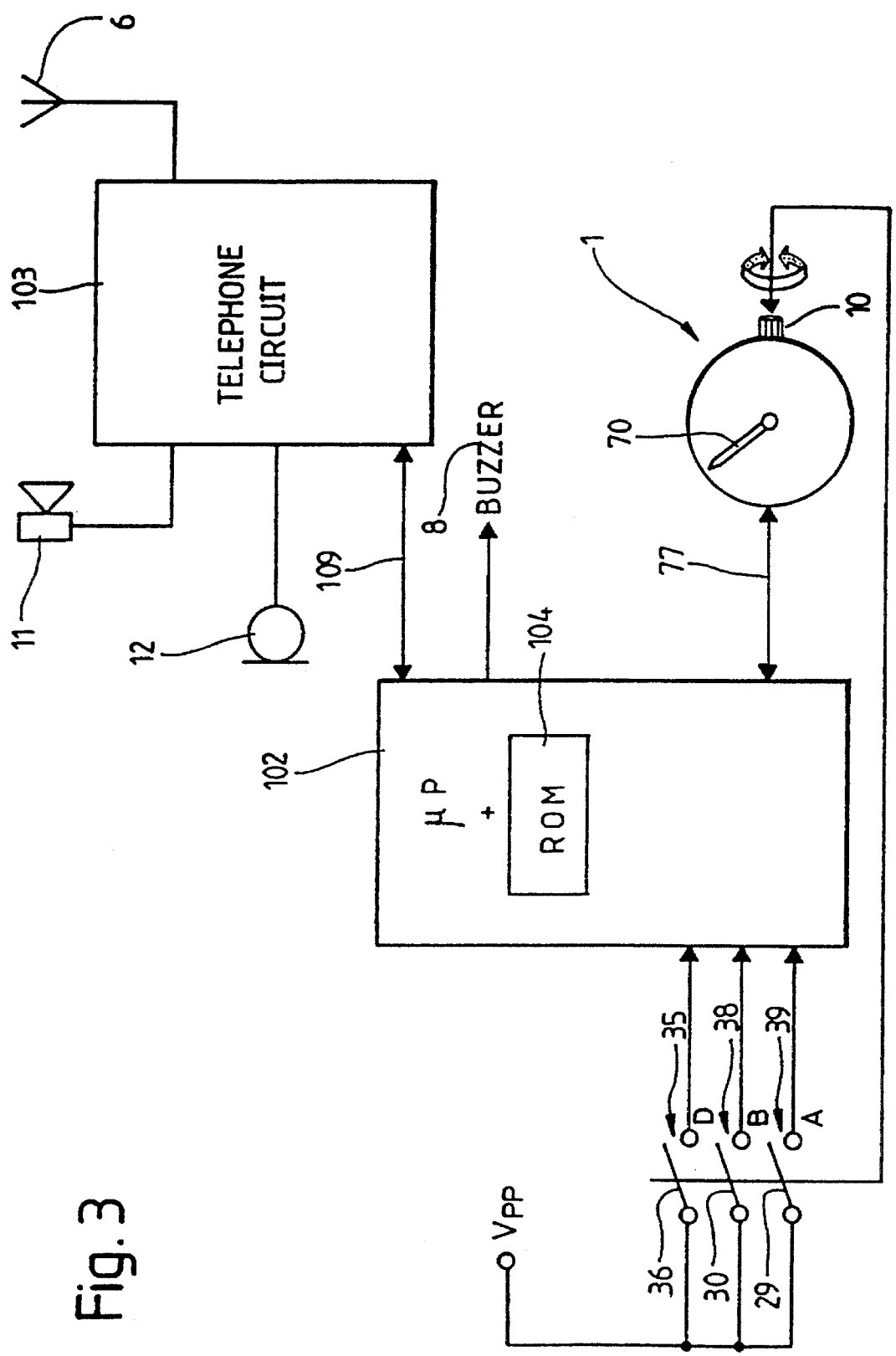
FIG. 3 is a general electrical schematic of the circuits making up the telephone of FIG. 1.
Figure 5:
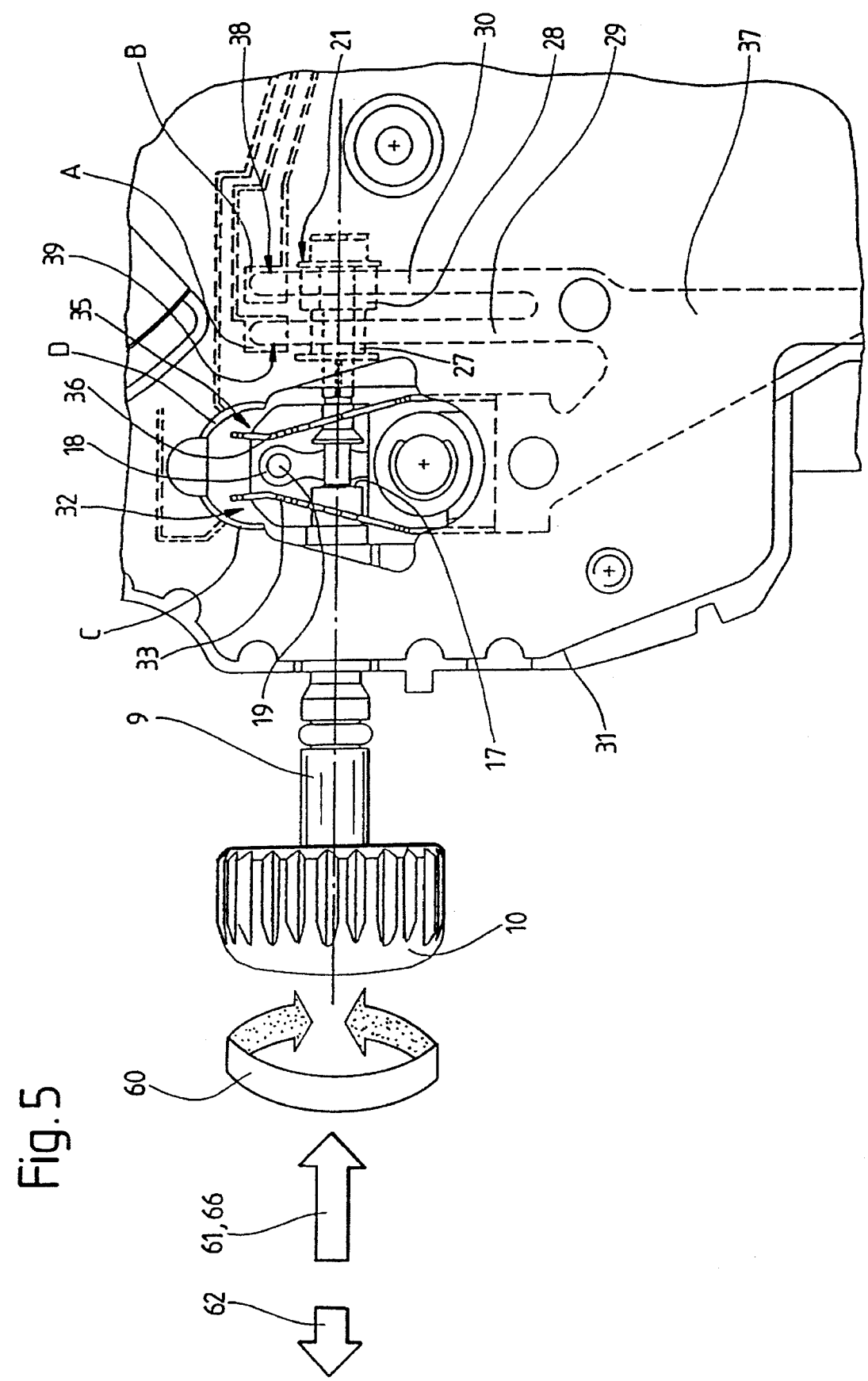
FIG. 5 is a plan view of the mechanism of the crown fitting out the telephone according to the invention.

The circuit making up the telephone of FIG. 1 is illustrated on FIG. 3. It includes basically a telephone circuit 103 (for example that commercialized by the Philips Company) to which the antenna 6, the microphone 12, the earpiece 11 and a microprocessor μP 102 chosen among those found on the market are attached. Such microprocessor, furnished with a ROM memory 104, manages the information coming from crown 10, such information being generated by switches 35, 38 and 39 controlled by crown 10. The stepping motor driving hand 70 of the principal unit 1 is coupled to the microprocessor 102 by means of bus 77. Finally, a buzzer 8 or audible alarm is coupled to the same microprocessor 102. As will be seen in greater detail when FIG. 5 is discussed, when crown 10 is driven in rotation, elastic conductive blades 29 and 30 forming respectively switches 39 and 38, enter alternatively into contact with conductive tracks respectively designated by A and B, this having as purpose to cause hand 70 to progress from one digit to the other located on the dial of unit 1. Furthermore, when the crown is pressed, it is switch 35 which is closed, putting into contact the elastic blade 36 and the conductive track D, which enables confirmation of the chosen digit. A rotation of the crown enabling the correction step by step of a hand and the means put into operation to achieve such result are described in the Swiss patent document CH-A-643 427 (US-A-4 398 831).

The mechanism of the crown is similar to that described having regard to FIG. 5 showing the second embodiment of the invention. The reader will wish to refer thereto. It is to be noted, however, that in the first embodiment the drawing out of the stem according to figure 5 and arrow 62 does not exist and thus blade 33 and track C do not exist either.

Figure 4:
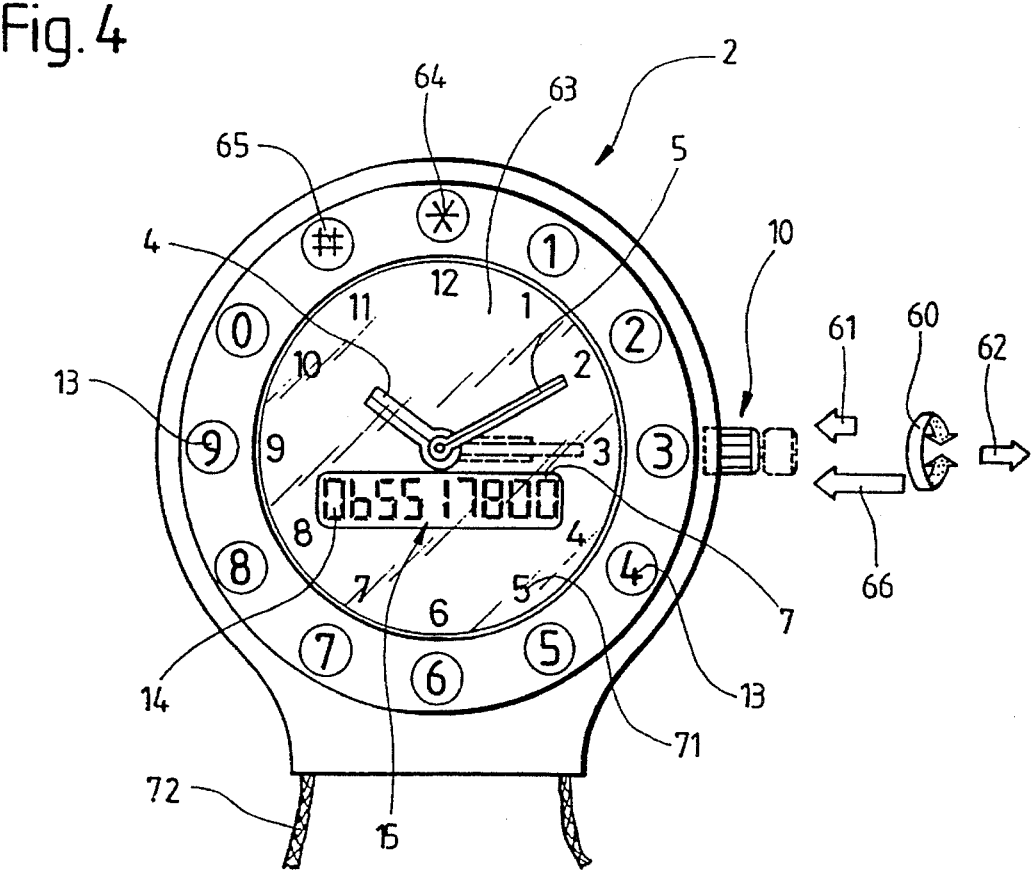
FIG. 4 is a plan view of the telephone according to the invention and according to a second embodiment implemented in the most complete sense thereof.

FIG. 4 is a plan view of the telephone according to the invention and according to a second embodiment which is more complete than that shown by FIG. 1. In FIG. 4, the dial bears twelve indications, that is to say the signs * 64 and #65 in addition to the digits 0 to 9. Dial 63 is surmounted by two hands 4 and 5 each driven by a stepping motor with dual rotation sense. Here the telephone includes a timekeeper also using the dial 63 and hands 4 and 5 for displaying the time of day. The indices 13 enable composing the telephone number and the indices 71 are reserved for displaying the time.

Crown 10 may be placed into three axial positions the first, pressed in and unstable, in particular for the need to confirm the digit chosen in the telephone mode, the second, neutral and stable, for the choice of the digit and the third, drawn out and stable, in order to enable setting the time on the timekeeper. To the principal unit 2 are coupled microphone, earpiece and antenna according to a method which has not been detailed since many solutions can be envisaged. The unit 2 can be attached around the neck by means of a collar, such unit assuming for example the dimensions of a chronograph used for timing sporting events.

Figure 6:
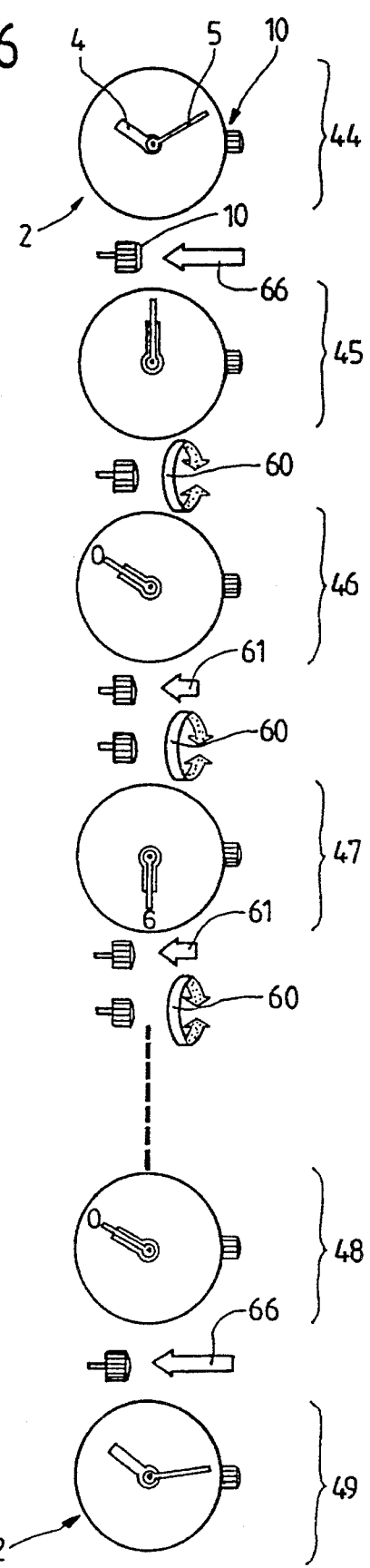
FIG. 6 is a table or flow chart explaining the various manipulations to be applied to the crown in order to compose the telephone number on the apparatus shown in FIG. 4.

The procedure to follow for passing from the timepiece mode to the telephone mode, the method of going about composing the telephone number, then returning to the timekeeping mode is to be explained in having reference to the flow chart of FIG. 6.

When the telephone is not in use, apparatus 2 indicates hours (hand 4) and minutes (hand 5), the time setting being effected by crown 10 drawn out (see step 44). A long duration pressure 66 exerted on crown 10 causes the apparatus to enter into the telephone mode, which has as a result the superposition, for example at noon, of hands 4 and 5 (step 45). From this moment on, if the crown 10 is impressed with a rotation movement, the superposed hands can be brought onto the first digit 0 making up the telephone number (step 46). Such digit is confirmed by a short-duration pressure 61 on crown 10. By exerting a new rotation 60 on the crown, the second digit 6 is chosen (step 47) which is again confirmed by a pressure 61 on the crown, this pressure being followed by a rotation 60 in order to choose the next digit. These operations are repeated until the number to be called, for example 065 51 78 00, is entirely composed. When the last digit 0 (step 48) has been confirmed, the calling signal rings at the correspondent's place. At the end of the conversation, the line is cut off by exerting a long pressure 66 on the crown, this action causing the return to the time display on apparatus 2 (step 49).

The remarks made during the description of the first embodiment and relative to the telephone systems for short or long distance are equally applicable to this second embodiment.

The mechanism of crown 10 is illustrated on FIG. 5. This concerns one of the figures taken over from the series shown in the patent document EP-A-0 569 868 to which one may refer if details of the design are desired. However, the operation of this mechanism will here be briefly recalled.

On crown 10 heading a stem 9 can be exerted either a rotational motion 60 or a pressure 61, 66 or again a drawing out 62. A sliding pinion 21 includes two stages 27 and 28 angularly shifted relative to one another by about 45°. Conductive blades 29 and 30 bear respectively on stages 27 and 28 in a manner such that when the sliding pinion 21 is driven in rotation by the stem, blades 29 and 30 enter alternatively into contact with conductive tracks designated by A and B, such blades and tracks forming respectively switches 39 and 38 and such tracks being engraved onto a printed circuit 31. FIG. 5 further shows that the crown mechanism includes two other switches. A first switch 32 is formed by a conductive blade 33 capable of coming into contact with a conductive track C formed on the printed circuit 31 when the crown is drawn out according to arrow 62. A second switch 35 is formed by a conductive blade 36 capable of coming into contact with a conductive track D, likewise formed on the printed circuit 31 when the crown is pressed according to arrows 61 and 66. A lever 18 on which is arranged a stud 19 cooperates with a groove 17 in the stem 9 in order to drive respectively blade C or D. Blades 29, 30, 33 and 36 comprise a single element having a common base 37. Such blades are blanked out in a metallic sheet, then square folded as far as concerns blades 33 and 36. The four blades are seen connected to a common electrical potential, namely Vpp as is apparent in the schematic of FIG. 7.

Switches 35, 32, 38 and 39 described hereinabove are schematically carried over onto FIG. 7 which shows the electrical arrangement of the watch telephone of the second embodiment of the invention. Such switches control a microprocessor 101 which has in its interior a ROM memory 104, a RAM memory 105 and a watch circuit. Microprocessor 101 bears a timebase 67 and is coupled by a bus 109 to a telephone circuit 103. This latter, which can be of the type commercialized by the Philips Company, communicates with the outer world by its antenna 6 and with the user by microphone 12 and the earpiece 11. The microprocessor controls respectively the bidirectional motors which drive hands 4 and 5 by the buses 77 and 77' respectively.

The time setting mode for the watch is entered by drawing out crown 10 the effect of which is to close switch 32. The time setting itself is brought about by turning the crown which has as effect to drive alternatively the switches 38 and 39. The rotation of the crown at an angular velocity lower than a predetermined velocity enables a step by step correction in plus or in minus of the minutes indication according to the sense of rotation of the crown, while a rotation of the crown at a velocity greater than said predetermined velocity enables rapid correction in plus or minus of the hours indication by entire time zones according to the sense of rotation of the crown. The means put into operation for such corrections are described in detail in the patent document CH-A-643 427 (U.S. Pat. No. 4,398,831), such means being taken over into this second embodiment of the present invention.

The composition of the telephone number is made in the neutral position of crown 10 and in exerting thereon as mentioned hereinabove rotational movements 60 and pressures 61, 66 according to the procedure explained hereinabove and illustrated on FIG. 6. To that effect, the microprocessor 101 of FIG. 7 is fitted with a ROM memory 104 which manages information coming from crown 10. The RAM memory 105 has as principal function to retain the time of day in memory and to restore it when passage from the telephone mode to the timekeeping mode takes place. In the case in which the telephone must store the complete telephone number before sending it, such RAM memory has also as purpose to store such number. The microprocessor 101 further includes a watch circuit intended to display the time of day. Such circuit, for example of the type H 5026 of the EM Microelectronic-Marin SA Company, includes a frequency divider and a driver which by lines 77 and 77' drive two dual rotation sense stepping motors. How, starting from a pressure on the crown, such hands 4 and 5 come into superposition, then are together displaced has already been explained in the document EP-A-0 589 353. The reader interestedby such technique will want to refer to this publication which can be taken over in the present invention.

Figure 7:
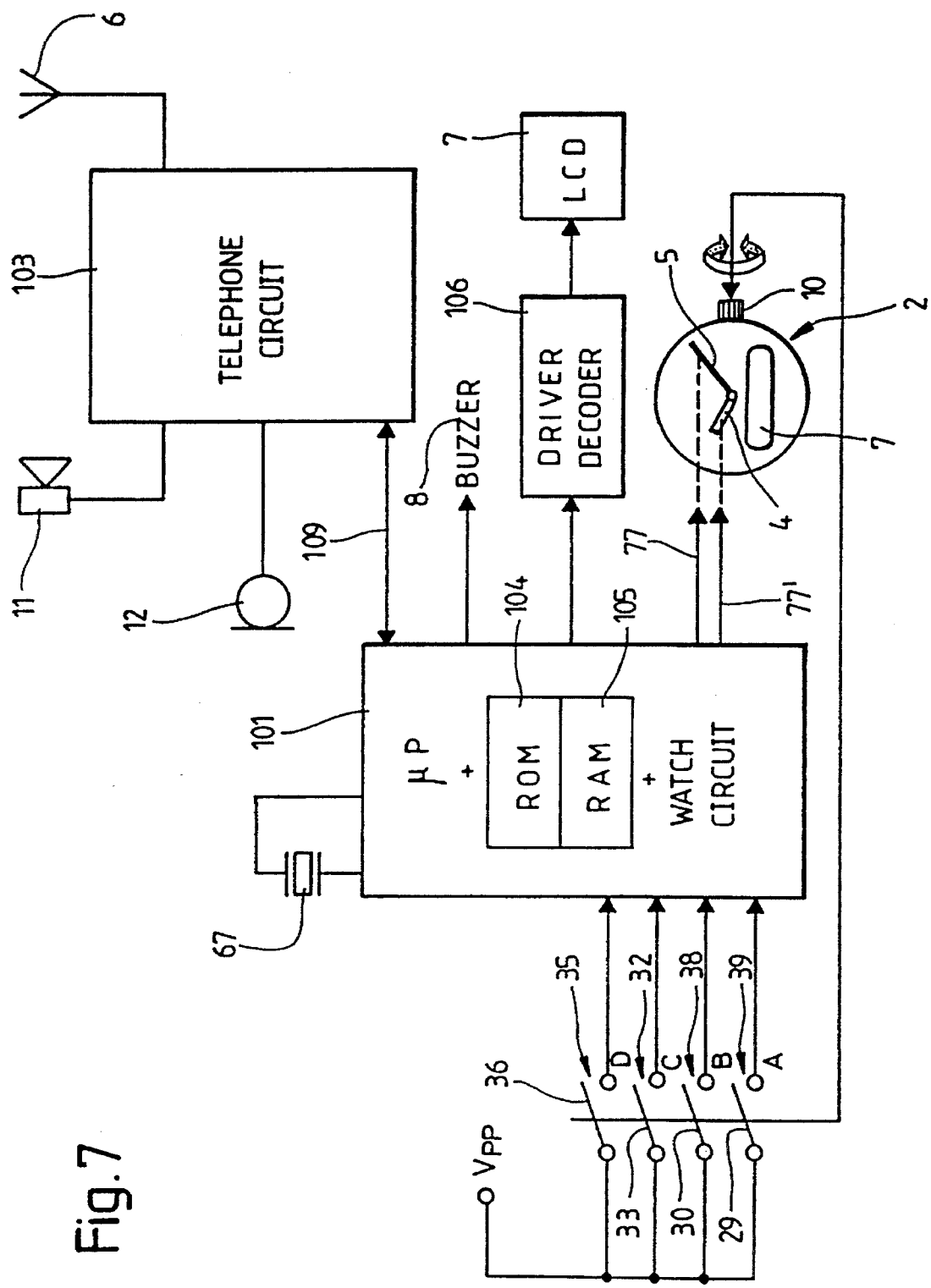
FIG. 7 is a general electrical schematic of the circuits making up the telephone of FIG. 4.

FIGS. 4 and 7 show that it is possible to add to this watch of the second embodiment a supplementary display including a liquid crystal cell 7. Such cell is energized according to FIG. 7 by a driver decoder 106 receiving its information from the microprocessor 101. Such additional display is endowed with a plurality of digits 14 causing the appearance of the complete telephone number 15, the digits 14 appearing progressively as they are confirmed by pressure on crown 10 (FIG. 4).

The third embodiment of the invention is shown on FIGS. 8 and 9. Here the display system includes only a liquid crystal cell 7 which includes a plurality of compartments 14, each capable of displaying the digits 0 to 9.

As is shown by the flow chart of FIG. 9, the telephone mode or the line is entered by exerting a long duration pressure 66 on crown 10. From this instant, the first digit 14 blinks (step 50). In exerting a rotation 60 on crown 10, the first digit is chosen, here the 0, which is confirmed by pressure 61 on the crown. At this instant digit 0 no longer blinks and the digit which follows it begins to blink in turn (step 51). This second digit is again chosen by rotation 60 of crown 10, for example the 6 which is confirmed by a new pressure 61. Digit 6 stops blinking and the third then begins to blink (step 52). This manner of action is continued until the entire telephone number 15 is displayed (step 53). At this moment, a long pressure 66 sends the number onto the line and the entire indication on the display 7 disappears (step 54).

The embodiments of the invention described hereinabove have shown with what facility it is possible to compose a telephone number with a crown coming from the known horological technology. Proceeding in this manner is ergonomic for a small volume unit in which the standard composition keys are difficult to use.

What I claimed is:

1. A portable wireless telephone including a principal unit of small volume, a microphone and an earpiece coupled to said principal unit, such latter comprising means for composing a number to be called, including at least one display system in which at least the digits from 0 to 9 making up the number to be called can be displayed one after another by the manipulation of a crown of the horological type, such display system including a dial on which at least the digits 0 to 9 appear, such dial being surmounted by two hands each driven by a stepping motor having a dual sense of rotation, the telephone including a timekeeper also using said dial and said hands in order to display the time of day, at least one of said motors being controlled by the rotation of the crown in order to bring one of said hands onto the chosen digit, said crown being capable of being rotated then pressed in order respectively to choose a digit making up said number, then to confirm said digit and continuing thus until said number is entirely composed.

2. A telephone as set forth in claim 1, including means which are put into operation so that upon a first pressure on the crown the hands are superposed, and upon rotation of the crown the united hands are adapted to point to the chosen digit and that by a second pressure on the crown the chosen digit is confirmed, such operations being repeated until the telephone number is entirely composed, the return to the display of time being effected by exerting a second, long pressure on the crown.

3. A telephone as set forth in claim 1, the dial further including a liquid crystal cell in which the digits making up the telephone number appear successively upon their confirmation.

4. A telephone according to claim 1, the display system including a liquid crystal cell having a plurality of compartments each capable of displaying the digits 0 to 9, a first pressure on the crown causing the first digit to blink, such digit being then capable of being incremented or decremented by rotation of the crown in one sense or in the other sense and then confirmed by a second pressure on said crown, such pressure stopping the blinking of said first digit chosen and starting blinking of the second digit and continuing thus until the telephone number is entirely composed.

* * * * *